(12) United States Patent
Cohen et al.

(10) Patent No.: US 10,439,914 B2
(45) Date of Patent: Oct. 8, 2019

(54) SYSTEM AND METHOD TO DETERMINE AND REPAIR NETWORK CONNECTION PROBLEMS

(71) Applicant: SCHNEIDER ELECTRIC IT CORPORATION, West Kingston, RI (US)

(72) Inventors: Daniel C. Cohen, Newtonville, MA (US); James S. Spitaels, Shrewsbury, MA (US)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 241 days.

(21) Appl. No.: 15/434,129

(22) Filed: Feb. 16, 2017

(65) Prior Publication Data
US 2018/0234313 A1 Aug. 16, 2018

(51) Int. Cl.
| | | |
|---|---|---|
| G06F 15/173 | (2006.01) |
| H04L 12/26 | (2006.01) |
| H04L 12/24 | (2006.01) |
| H02J 9/06 | (2006.01) |
| H02J 13/00 | (2006.01) |
| G06F 1/26 | (2006.01) |
| G06F 15/177 | (2006.01) |
| H04L 29/12 | (2006.01) |

(52) U.S. Cl.
CPC ............ *H04L 43/0817* (2013.01); *G06F 1/26* (2013.01); *G06F 1/266* (2013.01); *H02J 9/06* (2013.01); *H02J 13/00* (2013.01); *H04L 41/0668* (2013.01); *H04L 41/0672* (2013.01); *H04L 41/0681* (2013.01); *H04L 61/1511* (2013.01); *Y02B 90/222* (2013.01); *Y04S 20/12* (2013.01)

(58) Field of Classification Search
CPC ..................... H04L 43/0817; H04L 41/0672
USPC ......................................................... 709/224
See application file for complete search history.

(56) References Cited

U.S. PATENT DOCUMENTS

| | | |
|---|---|---|
| 8,204,990 B1 | 6/2012 | Avery et al. |
| 8,365,018 B2 | 1/2013 | McIntosh et al. |

(Continued)

FOREIGN PATENT DOCUMENTS

| | | |
|---|---|---|
| EP | 1832955 A1 | 9/2007 |
| EP | 3107185 A1 | 12/2016 |
| WO | 2014163604 A1 | 10/2014 |

OTHER PUBLICATIONS

Extended European Search Report from corresponding European Application No. 18157217.3 dated Mar. 28, 2018.

*Primary Examiner* — Karen C Tang
(74) *Attorney, Agent, or Firm* — Lando & Anastasi, LLP

(57) ABSTRACT

A power device includes an input configured to receive input power from a power source, power circuitry, a power output, a network module, and a controller. The controller is configured to operate the power circuitry to provide output power to the power output derived from the input power and to communicate with at least one primary server via the network module. In response to a determination that communication with the primary server has failed, the controller is configured to attempt communication with a domain name server. In response to a determination that communication with the domain name server has failed, the controller is configured to identify that the network has failed.

17 Claims, 4 Drawing Sheets

(56) References Cited

U.S. PATENT DOCUMENTS

| | | | |
|---|---|---|---|
| 2007/0210650 A1* | 9/2007 | Togashi | G06F 11/1441 307/43 |
| 2009/0013210 A1* | 1/2009 | McIntosh | H04L 41/0672 714/4.1 |
| 2010/0267390 A1* | 10/2010 | Lin | H04L 51/38 455/445 |
| 2010/0313064 A1* | 12/2010 | Boctor | H04L 43/0811 714/4.1 |
| 2016/0365750 A1 | 12/2016 | Fallon et al. | |

* cited by examiner

SYSTEM AND METHOD TO DETERMINE AND REPAIR NETWORK CONNECTION PROBLEMS

BACKGROUND OF INVENTION

Field of the Invention

At least one example in accordance with the present invention relates generally to the improvement of reliability of network connected equipment.

Discussion of Related Art

Due to the increased importance of network connectivity and the increased complexity of networks, the impact of inadvertent downtime in a network may be greater than ever. Customers commonly utilize backup power devices to provide power to network equipment (e.g., servers, routers, switches, etc.) to increase the availability of the equipment. For example, Uninterruptible Power Supplies (UPS) are commonly used to provide regulated, uninterrupted power to sensitive and/or critical loads, such as network equipment. In a typical UPS, a battery is used to provide backup power for a critical load during blackout or brownout conditions. An operator of a UPS is typically able to configure and control the UPS either through a computer coupled to the UPS or through a user interface of the UPS itself.

SUMMARY

According to one aspect, a power device is provided and includes an input configured to be coupled to a power source and to receive input power from the power source; power circuitry coupled to the input; a power output coupled to the power circuitry; a network module configured to be coupled to a network; and a controller coupled to the power output, the power circuitry and the network module. The controller is configured to operate the power circuitry to provide output power to the power output derived from the input power; attempt to communicate with at least one primary server via the network module; in response to a determination that communication with the primary server has failed, attempt to communicate with a domain name server via the network module; and in response to a determination that communication with the domain name server has failed, identify that the network has failed.

In at least one embodiment, in response to identifying that the network has failed, the controller is further configured to cycle power to the power output. The controller may be further configured to increment a counter each time the power is cycled to the power output.

In an embodiment, the controller is further configured to receive from an operator, via a management interface, an indication of whether the power output is coupled to a network device or a non-network device. The controller may be further configured to cycle power to the power output indicated as coupled to a network device, in response to identifying that the network has failed.

In an embodiment, the controller is further configured to provide a management interface to a management system and to display, via the management interface, a plurality of network configuration options. One network configuration option may include a rebooting feature implementation option and in response to the operator selecting, via the management interface, the rebooting feature implementation option with respect to the power output, the controller is further configured to operate the power output to cycle power responsive to identifying that the network has failed.

In an embodiment, the controller may be configured to perform at least one of enabling the power output, disabling the power output, or cycling power to the power output, in response to identifying that the network has failed.

In embodiments, the power output is a dynamic output, and the controller is further configured to receive from an operator, via a management interface, an indication of a type of equipment coupled to the dynamic output.

In embodiments, at least one of the power output is a static output, and the controller is further configured to permanently identify the static output as being coupled to a specific type of equipment.

At least one embodiment further comprises a battery coupled to the power circuitry and configured to provide battery power to the power circuitry, and the controller is further configured to operate the power circuitry to provide output power to the power output derived from at least one of the input power and the battery power.

Another aspect in accord with the present invention is directed to a method for controlling power to a network device, the method comprising periodically checking, by a controller, a status of a network connection, to include sending a domain name query to a domain name server; and controlling, by the controller, a power output to which the network device is coupled to temporarily disrupt power to the network device in response to failing to receive a reply from the domain name server.

In an embodiment, the controller provides a management interface to an operator and receives, via the management interface, an indication of the power output to which the network device is coupled.

In at least one embodiment, periodically checking the status of the network connection includes attempting to communicate with at least one primary server.

In embodiments, the method includes indicating a network failure in response to failing to receive a reply from the domain name server, to include at least one of causing an alert message to be displayed, illuminating a visual indicator, and sounding an audible indicator.

In embodiments, the method includes providing power to the power output by power circuitry configured to derive output power from an input power and to provide the output power to the power output. The method may further include detecting a condition of the input power.

In embodiments, the method includes increasing a delay between periodic checking the status of the network, based upon a number of times power has been temporarily disrupted.

In embodiments, sending a domain name query to a domain name server includes sending a domain name query to a plurality of domain name servers, and a reply from any of the plurality of domain name servers is a reply to the domain name query.

Another aspect in accord with the present invention is directed to a network connectivity confirmation system comprising a power controller configured to provide power to a network access device coupled to a network; and a network monitoring device configured to periodically attempt a domain name query with at least one domain name server via the network access device and the network, and configured to identify that the network has failed in response to a determination that it cannot communicate with the at least one domain name server.

In some embodiments, the network monitoring device is further configured to periodically attempt to communicate with at least one primary server via the network access device and the network and configured to periodically attempt the domain name query in response to a determination that it cannot communicate with the at least one primary server.

In some embodiments, identifying that the network has failed includes at least one of causing the power controller to cycle power to the network access device, sending an alert message to a management interface, and indicating that the network has failed by at least one of a visual and audible indicator.

In some embodiments, identifying that the network has failed includes incrementing a counter, and periodically attempting a domain name query includes waiting an amount of time before attempting a subsequent domain name query, wherein the amount of time is responsive to the counter.

Still other aspects, embodiments, examples, and advantages of these exemplary aspects and embodiments are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
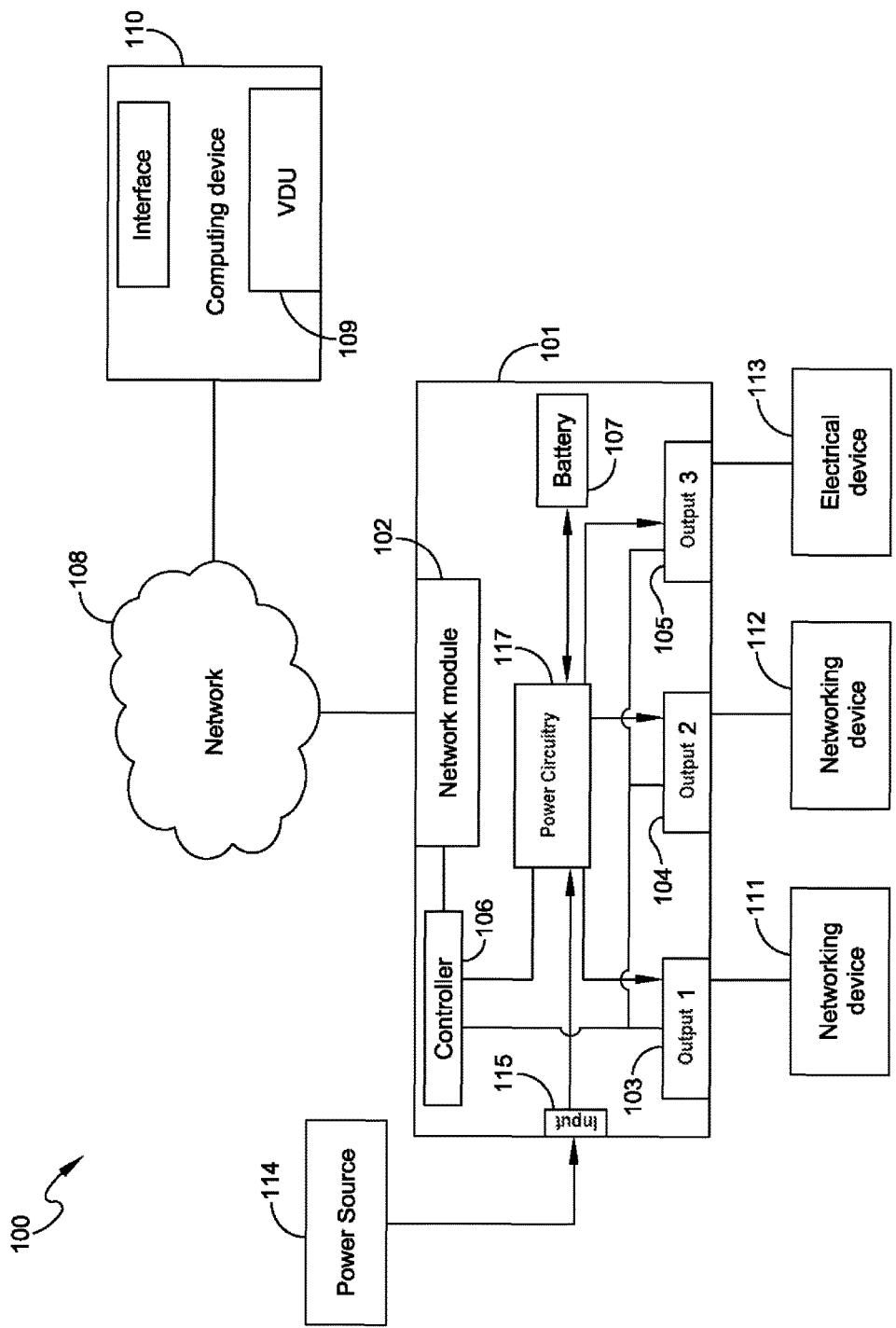
FIG. 1 is a block diagram of a network system including an Uninterruptible Power Supply (UPS) system in accordance with aspects of the present invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, Uninterruptible Power Supplies (UPS) are commonly used to provide regulated, uninterrupted power to sensitive and/or critical loads, such as network equipment. Some conventional UPS's include power outputs that are selectively configurable, by an operator, to provide different features. The control and configuration of the outputs is typically managed with a UPS management User Interface (UI) which can be accessible via a mobile application, tablet computer, desktop computer, etc. The UPS management UI can also be accessible via display on the UPS itself. Through operation of the UPS management UI, an operator can select which features are to be implemented at each one of the outputs, whereby power is provided to a coupled device.

The UPS management UI may allow an operator to configure a power output with available features. For example, a timer feature may automatically alternate an operational state of an output (e.g., turns on or off the output) during a scheduled period of time. Such a feature may be helpful to automatically turn off lights coupled to an output during the day; however, if the timer feature is implemented with an output coupled to important network equipment (e.g., a modem or a router), the network equipment may be turned off and the user may inadvertently lose network access. Alternatively, a rebooting feature automatically cycles power to an output if needed. Such a feature may be helpful to automatically cycle power to network equipment when a network connectivity issue is identified; however, if the rebooting feature is implemented with an output coupled to non-network equipment (e.g., a light, a phone, a display, etc.), power to the non-network equipment may be cycled inadvertently which can waste power and create user confusion (e.g., due to the equipment randomly turning off and on). Embodiments described herein may be coupled with a UPS system that implements a rebooting feature for power outputs configured to provide power to networking equipment.

FIG. 1 is a block diagram of a network system 100 including an Uninterruptible Power Supply (UPS) system 101 in accordance with aspects of the present invention. The UPS system 101 includes a power input 115, power circuitry 117, a network module 102, one or more power outputs (such as a first output 103, a second output 104, a third output 105, etc.). a controller 106, and a battery 107. The controller 106 is coupled to the first output 103, the second output 104, the third output 105, and the network module 102. The controller 106 is also coupled to the power circuitry 117. The network module 102 is configured to be coupled to an external computing device, such as a management system 110 via a network 108. The first output 103 is configured to be coupled to a first load 111. The second output 104 is configured to be coupled to a second load 112. The third output 105 is configured to be coupled to a third load 113. The power input 115 of the UPS 101 is configured to be coupled to a power source 114. The power circuitry 117 is coupled between the power input 115 and the outputs 103, 104, 105. The power circuitry 117 is also coupled to the battery 107. Certain embodiments may include more or fewer outputs. Power outputs may be in the form of an outlet or other electro-mechanical coupling or may include power outputs in forms other than an outlet, for example, as a hard-wired connection or a switchable connection, and may be user-disconnectable or may not be user-disconnectable. Additionally, power outputs may provide alternating current (AC) or direct current (DC), such as to rack-mounted equipment supplied with rack power or with power integrated to the rack. AC or DC type, voltages, and the like may be configurable per power output.

The UPS 101 is configured to receive, at the input 115, input power from the power source 114. If the controller 106 determines that the input power is acceptable (e.g., at least at a desired level), the controller 106 operates the power circuitry 117 to provide desired output power to each output 103, 104, 105 derived from the input power. If the input power is acceptable, the controller 106 may also operate the power circuitry 117 to provide power to the battery 107 to charge the battery 107. If the controller 106 determines that the input power is unacceptable (e.g., below the desired level), the controller 106 operates the power circuitry 117 to provide desired output power to each output 103, 104, 105 derived from backup power provided by the battery 107. According to one embodiment, the power circuitry 117 includes conversion circuitry (e.g., at least one converter and/or an inverter) that is operated by the controller 106 to generate regulated output power from the input power and/or the backup power.

The controller 106 may be configured to communicate with the management system 110 via the network module 102 and the network 108. In one embodiment, the management system 110 is a computing device such as an operator's computer system; however, in other embodiments, the management system 110 may be any other type of system capable of communicating with the UPS 101 (e.g., a mobile phone, tablet computer, etc.). In one embodiment, the network 108 is the Internet; however, in other embodiments, the network 108 may be any other type of Wide Area Network (WAN). According to another embodiment, the network 108 is a Local Area Network (LAN). In other embodiments, the network 108 may be any other type of network capable of facilitating communication between the UPS 101 and the management system 110. According to other embodiments, the controller 106 is configured to communicate with any other type of management system that is configured to provide signals to the UPS 101 to control operation of the UPS 101. In other embodiments, the controller 106 is configured to communicate with any number of different external systems (e.g., computing devices, management systems, etc.) via the network module 102 and the network 108, or the controller 106 may not communicate with external systems (e.g., the controller 106 may be statically pre-configured or may be locally configured via a local user interface).

In some embodiments, the controller 106 may provide a UPS management UI to the management system 110 via the network module 102 and the network 108. In one embodiment, the UPS management UI is displayed to an operator via a Video Display Unit (VDU) 109. The operator can interact with the UPS management UI via an interface (e.g., a keypad, touchpad, keyboard, mouse, etc.) of the management system 110. In at least one embodiment, the UPS management UI allows the operator to select feature options appropriate for each power output (e.g., outputs 103, 104, 105), such as what action to take in response to determining a network failure, such as enabling a power output, disabling a power output, or cycling a power output, for example.

According to at least one embodiment, the UPS 101 includes a mix of static and dynamic outputs, which may include individual outputs. A static output is an output that is permanently configured to be coupled to a certain type of load, and therefore permanently configured to perform a certain action in response to determining a network failure. For example, in one embodiment, the first output 103 of the UPS 101 is a static output permanently configured to be coupled to a piece of network equipment suitable for rebooting during a network failure, and the third output 105 is a static output permanently configured to be coupled to a piece of non-network equipment not suitable for rebooting during a network failure. The second output 104 is a dynamic output which may be identified, by the operator, as being coupled to a network or non-network piece of equipment, or may be configured, by the operator, to perform a certain action in response to determining a network failure. According to other embodiments, the UPS 101 may include any number of static and/or dynamic outputs.

Certain features can be implemented for appropriately configured outputs. For example, in one embodiment, a rebooting feature (e.g., a "Watchdog" feature) automatically cycles power to the output when a network connectivity issue is detected. In embodiments, a controller coupled to network equipment attempts to communicate with a remote server at predetermined times. If the controller is unable to communicate with the remote server, the controller determines that there is a connectivity issue and cycles power to the power output, which may reboot a piece of network equipment coupled to and powered by the power output. One or more remote servers may be part of a primary cloud service that supports checking of network connectivity by responding to client connection requests. The primary cloud service may include dedicated and non-dedicated servers for the purpose of checking connectivity by responding to client requests. The primary cloud service may not be available at some times, however, due to reasons other than a failure in network connectivity. For example, the primary cloud service may be unavailable because of a failure at the primary cloud service even though regular network connectivity is otherwise operational, e.g., other services and network connected equipment may be reachable. If a test for network connectivity operates by only attempting to communicate with the primary cloud service, the robustness of the system is limited in that if the cloud service is unavailable, the networking equipment may be restarted unnecessarily, impacting network connectivity.

Embodiments described herein provide a network connectivity confirmation system that utilizes multiple servers and protocols, dedicated and non-dedicated, to confirm network connectivity. By using multiple servers and protocols, each of different types, the system provides enhanced network resilience.

Figure 2:
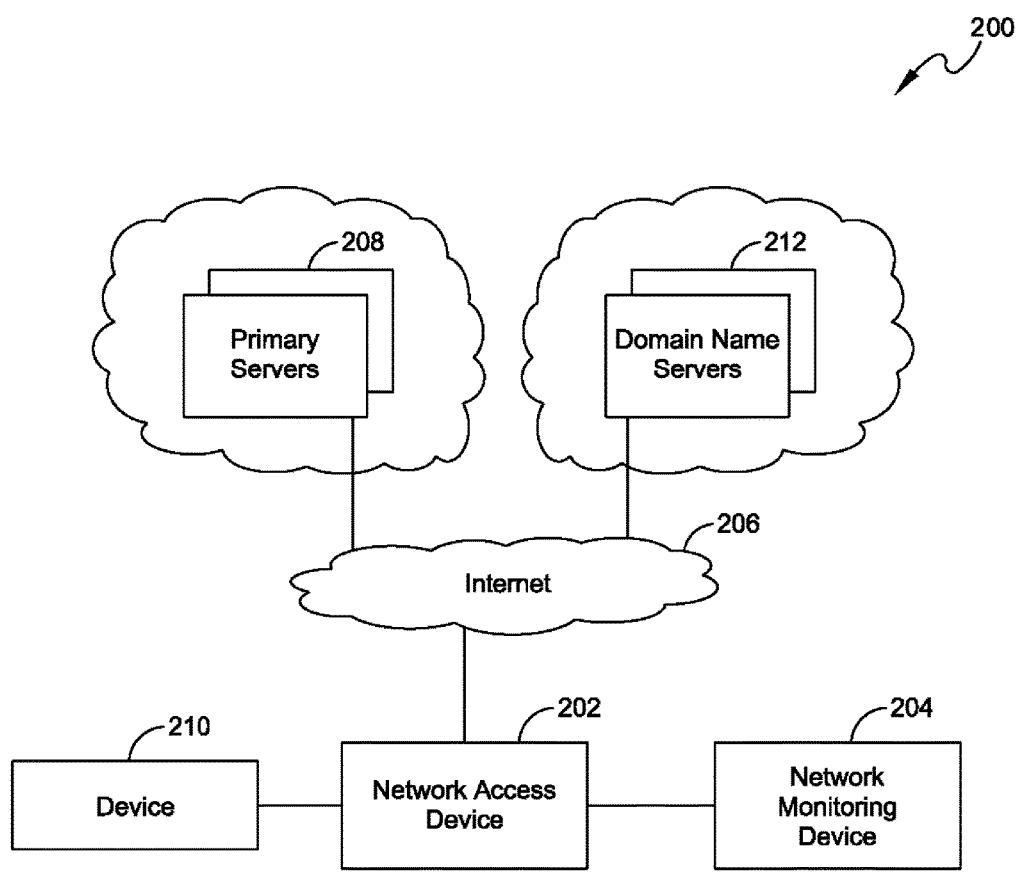
FIG. 2 is a block diagram of one embodiment of a network connectivity confirmation system in accordance with aspects of the present invention.

FIG. 2 is a block diagram of one embodiment of a network connectivity confirmation system 200. The system 200 includes a network access device 202, a network monitoring device 204, and a primary cloud service comprised of one or more primary (and optional secondary) servers 208. The network monitoring device 204 is coupled to the network access device 202. The network access device 202 is configured to allow communication with the primary servers 208 via a network 206. In one embodiment, the network 206 is the Internet; however, in other embodiments, the network 206 may be any type of LAN or WAN.

The network access device 202 is a piece of network equipment (e.g., a server, router, switch, etc.) that provides network 206 access to other devices, such as device 210. According to one embodiment, the network access device 202 is a piece of network equipment that is coupled to a network configured output of the UPS 101 described above with regard to FIG. 1; however, in other embodiments, the network access device 202 may be any other type of network access device that provides network excess to other devices, and may be included within or provided in combination with a UPS or a network monitoring device.

The network monitoring device 204 is configured to communicate with the network 206 via the network access device 202. According to one embodiment, the network monitoring device 204 is also able to control power supplied to the network access device 202. For example, in one embodiment, the network monitoring device 204 is located in a UPS (e.g., the UPS 101 discussed above with regard to FIG. 1) to which the network access device 202 is coupled. In one embodiment, the network monitoring device 204 is located in the controller 106 of the UPS 101 or is otherwise in communication with the controller 106; however, in other embodiments, the network monitoring device 204 may be located in the network access device 202 or configured in some other appropriate way.

In determining the status of the network 206, the network monitoring device 204 periodically tests network connectivity to the primary cloud service by attempting to communicate with the primary servers 208. The primary servers 208 are servers in which one function of the server is to determine the operational status of the network 206 (i.e., by responding to communications from the network monitoring device 204). In at least one embodiment, if the network monitoring device 204 is unsuccessful in communicating with one of the primary servers 208, the network monitoring device 204 may attempt to communicate with additional servers that are part of the primary cloud service. If the network monitoring device 204 is unsuccessful at communicating with any of the servers of the primary cloud service, the network monitoring device 204 may declare the primary cloud service unreachable. The primary cloud service may be unreachable because of a problem with connectivity through the network 206, or the primary cloud service may be unreachable because of an issue at the primary cloud service.

To determine whether the primary cloud service is unreachable due to a network problem, the network monitoring device 204 uses an additional method to check for network connectivity more generally. The additional method involves using a Domain Name Service (DNS) query to check for connectivity to one or more domain name servers 212 otherwise reachable via the network 206. If after failing to communicate with the primary cloud service, the network monitoring device 204 is unsuccessful at communicating with a domain name server 212, the network monitoring device 204 then identifies that there is a problem with the network 206. Upon identifying that there is a problem with the network 206, the network monitoring device 204 may notify the operator, cycle power to the network access device 202, or take some other appropriate action.

Figure 3:
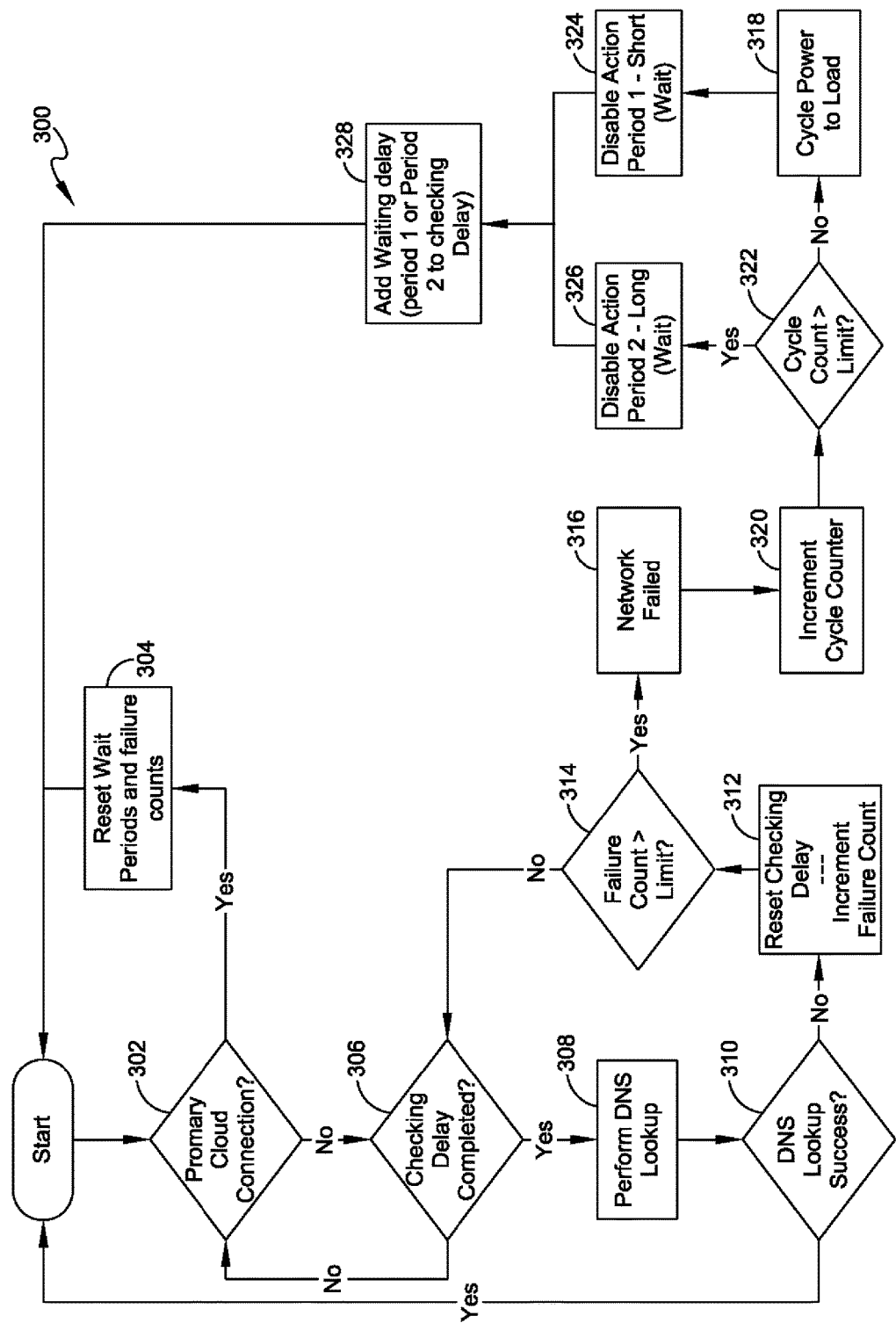
FIG. 3 is a flow chart illustrating one embodiment of a network connectivity confirmation process in accordance with aspects of the present invention.

Operation of the system 200 is discussed in greater detail with regard to FIG. 3, which is a flow chart illustrating one embodiment of a network connectivity confirmation process 300 implemented by the system 200. At block 302 the network monitoring device 204 determines whether there is a connection to a primary cloud service, e.g., by attempts to communicate with the primary cloud service (i.e., by transmitting a signal to one of the primary servers 208) via the network access device 202 and the network 206. According to one embodiment, the network monitoring device 204 attempts to communicate with the primary cloud service by utilizing the Transmission Control Protocol (TCP) and/or the User Datagram Protocol (UDP); however, in other embodiments, the network monitoring device 204 may utilize some other protocol to communicate with the primary cloud service. At least one example of a method to determine a primary cloud connection is described in U.S. patent application Ser. No. 14/739,466 titled SYSTEM AND METHOD TO IMPROVE NETWORK RELIABILITY, filed on Jun. 15, 2015, which is incorporated herein by reference.

In response to a determination (at block 302) that the network monitoring device 204 is able to communicate with the primary cloud service, the network monitoring device 204 determines that the network 206 is operating correctly and resets any wait period and/or failure counts at block 304. After a period of time, the network monitoring device 204 may attempt to communicate with the primary cloud service again (at block 302). In one embodiment, the period of time between connection attempts is configurable by the operator. According to one embodiment, a connection established between the network monitoring device 204 and a primary server 208, via the network 206 and the network access device 202, is secure.

At block 306, in response to a determination that it is not able to communicate with the primary cloud service, the network monitoring device 204 may track a delay time during which the network monitoring device will continue to check for ability to communicate with the primary cloud service (at block 302). If the network monitoring device 204 continues to be unable to communicate with the primary cloud service until the end of the delay period (at block 306), the network monitoring device 204 performs a DNS lookup at block 308.

The DNS lookup at block 308 includes sending a domain name query to a domain name server, such as one of the domain name servers 212, and monitoring for a response from the domain name server. Domain name servers resolve domain names into Internet Protocol (IP) addresses upon request. Domain name servers are operated privately and publicly. There are numerous publicly accessible domain name servers routinely available on the Internet infrastructure. Some domain name servers are particularly well known and many domain name servers are operated by companies that provide significant Internet and World Wide Web services. Due to the nature of some domain name servers and the significant service offerings provided by the companies that provide them, availability of such domain name servers, e.g., domain name servers 212, may far exceed the availability of the primary servers 208. Therefore domain name servers may provide significant backup capability for determining network connectivity when communication with a primary cloud service fails. Additionally, the network monitoring device 204 may perform multiple DNS lookups, i.e., by sending DNS queries to more than one remote domain name server, and a response from any one of the domain name servers may be sufficient to confirm that network 206 is operational, providing additional reliability to the determination of network connectivity.

For example, a few common domain name properties associated with companies that also operate publicly accessible domain name servers include google.com, amazon.com, and yahoo.com, but there are multiple others.

When a domain name is resolved into an IP address, some types of network equipment may cache the domain name resolution, storing the IP address associated with the domain name, and may answer subsequent DNS queries without allowing the DNS query out of the local network. To accommodate such a scenario, the network monitoring device 204 may be pre-configured with particular IP addresses of known domain name servers so that the network monitoring device 204 may send the DNS query directly to one or more domain name servers, thereby bypassing any local network equipment that might otherwise locally respond to the DNS query. In other embodiments, the network monitoring device may send DNS queries to an otherwise assigned domain name server, such as by an IP address assigned through Dynamic Host Configuration Protocol (DHCP). In yet other embodiments, one or more DNS queries may be sent in accord with any one or combination of DNS configurations.

At block 310, if the DNS lookup (from block 308) is successful, the network monitoring device 204 determines that the network 206 is functioning and returns to testing connectivity to the primary cloud service (at block 302). If the DNS lookup is not successful (at block 310), the network monitoring device 204 increments a failure count and resets a checking delay at block 312 and determines whether the failure count has reached a limit (at block 314). At block 316, responsive to the failure count reaching a limit, the network monitoring device 204 determines that network 206 connectivity has failed. In some embodiments, the failure count limit may be ten failures, but in other embodiments it may be more or fewer failures and may be configurable by an operator. In some embodiments, having been unsuccessful at communicating with the primary cloud service (at block 302) and having failed to complete a DNS lookup (at block 310), the network monitoring device 204 may directly declare a network failure (at block 316) without keeping track of failure counts or delays.

Responsive to the network monitoring device 204 determining that the network 206 has failed (at block 316), the network monitoring device 204 will attempt corrective action(s) to fix the network 206, for example by performing a power cycle at block 318 to reset one or more network access devices, such as network access device 202. For example, the network connectivity confirmation process 300 may be selectively implemented in a network configured output of the UPS 101 (shown in FIG. 1) and upon determining that the network 206 has failed, the network monitoring device 204 may send a command to the controller 106 to cycle power to the output of the UPS 101 to which the network access device 202 is coupled. Cycling power causes the network access device 202 to reset by rebooting. In other embodiments, the network connectivity confirmation process 300 may control a network configured output of another type of power device (e.g., a power strip, a smart outlet, etc.).

If repeated attempts to resolve the network 206 failure by resetting the network access device 202, i.e., by cycling power to the network access device 202, are unsuccessful, it may be futile to continue to cycle the power, and it may be bad for the network access device 202 whose power is being cycled. Accordingly in some embodiments, the network monitoring device 204 may optionally increment a counter of power cycles (at block 320) and not perform further power cycles after the cycle counter reaches a limit (at block 322).

Further in some embodiments, the network monitoring device 204 may generate a delay (at block 324) between successive determinations of network failure and subsequent power cyclings, and may generate a longer delay (at block 326) when successive power cyclings have failed to resolve the network 206 failure. Additionally, the network monitoring device 204 may successively increase waiting delays (at block 328) between successive checking for network 206 connectivity based on the number of iterative times the network 206 has been determined to be in failure (at block 316).

According to other embodiments, upon determining that the network 206 has failed, the network monitoring device 204 may take different corrective measures. For example, in some embodiments the network monitoring device 204 may transmit a message to the management system 110, may provide a message to an operator's display, or may operate some type of indicator (e.g., a light, sound generator etc.) to indicate that there is a network problem. In other embodiments, upon determining that the network 206 has failed, the network monitoring device 204 performs network analytics on the resulting data.

As described above, the network connectivity confirmation process 300 is implemented in a UPS; however, in other embodiments, the network connectivity confirmation process is implemented in some other network monitoring peripheral or some other power device (e.g., a power strip, smart outlet, or other device having capability to control power to the network access device, etc.).

As also described above, the network monitoring device 204 is configured to attempt communication with a domain name server only after communication has failed with the primary cloud service a predetermined number of times and/or for a predetermined amount of time; however, in other embodiments, the network monitoring device 204 may be configured to attempt communication with one or more domain name servers immediately after a communication failure with the primary cloud service. Similarly, the network monitoring device 204 is configured to identify a network failure only after communication has failed with the domain name server(s) a predetermined number of times; however, in other embodiments, the network monitoring device 204 may identify a network failure immediately after a communication failure with one or more domain name servers.

In embodiments, the network connectivity confirmation process 300 may be a selectable feature to control a power source to a network device, such as to control a power output coupled to the network device. An operator may selectively enable the connectivity confirmation process 300 to control an output of a power device, such as a UPS, an outlet strip, a smart outlet, etc. Additionally, the operator may choose not to implement the feature and turn the feature off with respect to one or more power outputs.

As described above, network failure is identified after communication attempts to both a primary cloud service and a domain name server have failed; however, in at least one embodiment, a network failure may be identified after communication to a single server or service fails. As also described above, communication is attempted with a single primary cloud service before communication with a domain name server is attempted; however, in other embodiments, communication may be attempted with multiple or no cloud services before communication is attempted with a domain name server, and communication attempts with any cloud service may include communication attempts with one or more primary servers and/or one or more secondary servers.

Embodiments described herein provide a network connectivity confirmation system that utilizes multiple servers, including a domain name server, to confirm network connectivity. By using domain name servers, including third party domain name servers having high availability, rather than only a primary cloud service, the system provides enhanced network resilience.

Figure 4:
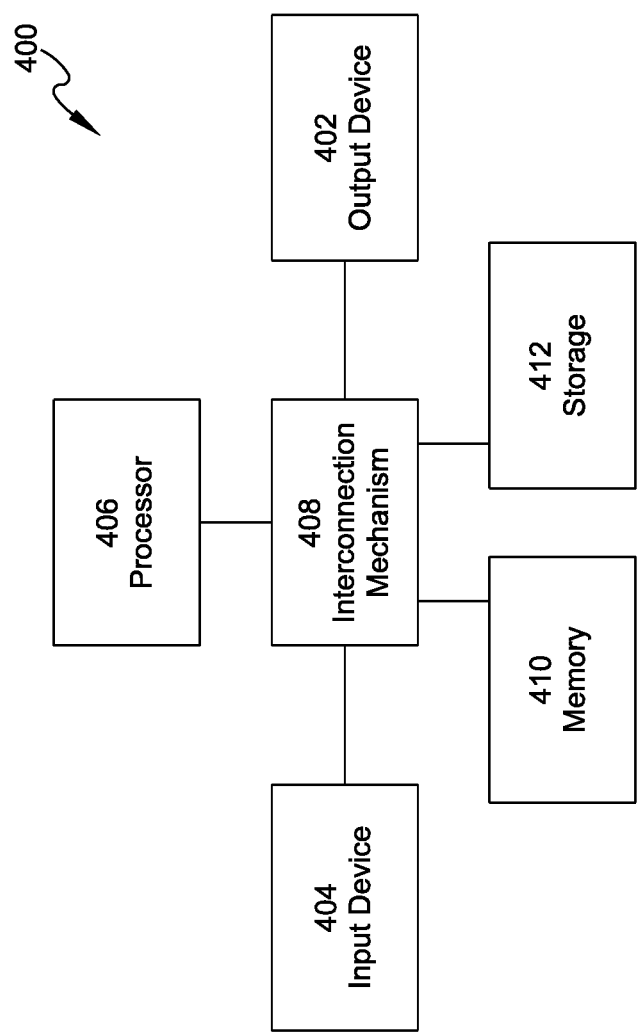
FIG. 4 is an example block diagram of computing components forming a system which may be configured to implement one or more aspects of the present invention.

FIG. 4 illustrates an example block diagram of computing components forming a system 400 which may be configured to implement one or more aspects disclosed herein. For example, the system 400 may be communicatively coupled to a controller 106 or included within a controller 106, and/or configured to provide a management interface to an operator or check the connectivity status of a network as discussed above.

The system 400 may include for example a computing platform such as those based on Intel PENTIUM-type processor, Motorola PowerPC, Sun UltraSPARC, Texas Instruments-DSP, Hewlett-Packard PA-RISC processors, ARM-Cortex M series processors, or any other type of processor or microcontroller. System 400 may include specially-programmed, special-purpose hardware, for example, an application-specific integrated circuit (ASIC). Various aspects of the present disclosure may be implemented as specialized software executing on the system 400 such as that shown in FIG. 4.

The system 400 may include a processor/ASIC 406 connected to one or more memory devices 410, such as a disk drive, memory, flash memory, embedded or on-chip memory, or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard, a mouse, or a touch screen. The system 400 includes one or more output devices 402, which may include for example a display. In addition, the computer system 400 may contain one or more interfaces (not shown) that may connect the computer system 400 to a communication network, in addition to or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC 406 than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or storage system 412.

The system 400 may include a computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used, including bare metal and/or virtual computing systems.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In certain embodiments, an uninterruptible power supply (UPS) has a controller and a network module, and the UPS controls the power provided to a network access device through a power output, such as via an outlet, direct power connection, or integrated rack power. The controller includes a processor, which may be any of the above or other suitable processors, including ASICs, which runs an instruction set or operates upon other logic, to implement a network connectivity confirmation process as discussed above. The controller thereby attempts communication with a primary cloud service, e.g., at least one primary server, and upon a failure condition to communicate with the primary cloud service the controller attempts communication with at least one domain name server. If a failure condition occurs with respect to communication with the domain name server, the controller may cycle power to the network access device to force the network access device to reboot, in an attempt to restore network connectivity. Various failure conditions may be used and include failure counts, delay times, timeouts, and the like. Attempted communication with a primary cloud service may include attempted communication with a primary server, an alternate primary server, a secondary server, etc., including multiples or alternate combinations of such servers.

As discussed above, certain embodiments include a UPS. UPS's may be used to provide regulated, uninterrupted power for sensitive and/or critical loads, such as computer systems and other data processing systems. Known uninterruptible power supplies include on-line UPS's, off-line UPS's, line interactive UPS's, as well as others. Uninterruptible power supplies may provide AC or DC output and may provide power regulation or may be unregulated. On-line UPS's provide conditioned power as well as back-up power upon interruption of a primary source of power.

Off-line UPS's typically do not provide conditioning of input power, but do provide back-up power upon interruption of the primary power source. Line interactive UPS's are similar to off-line UPS's in that they switch to battery power when a blackout occurs but also typically include a multi-tap transformer for regulating the output voltage provided by the UPS. Typical UPS's may also operate in a bypass mode where unconditioned power with basic protection is provided directly from a power source to a load via a bypass line.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A power device comprising:
   an input configured to be coupled to a power source and to receive input power from the power source;
   power circuitry coupled to the input;
   a power output coupled to the power circuitry;
   a network module configured to be coupled to a network; and
   a controller coupled to the power output, the power circuitry and the network module, the controller configured to:
      operate the power circuitry to provide output power to the power output derived from the input power;
      attempt to communicate with at least one primary server via the network module;
      in response to a determination that communication with the primary server has failed, attempt to communicate with a domain name server via the network module;
      in response to a determination that communication with the domain name server was successful, continue to provide output power to the power output;
      in response to a determination that communication with the domain name server and the primary server has failed, identify that the network has failed; and
      in response to identifying that the network has failed, cycle power to the power output.

2. The power device of claim 1, wherein the controller is further configured to increment a counter each time the power is cycled to the power output.

3. The power device of claim 1, wherein the controller is further configured to receive from an operator, via a management interface, an indication of whether a network device or a non-network device is coupled to the power output.

4. The power device of claim 3, wherein in response to identifying that the network has failed, the controller is further configured to cycle power to the power output in response to the power output being indicated as coupled to a network device.

5. The power device of claim 1, wherein the controller is further configured to provide a management interface to a management system and display, via the management interface, a plurality of network configuration options.

6. The power device of claim 5, wherein at least one network configuration option includes a rebooting feature implementation option and in response to the operator selecting, via the management interface, the rebooting feature implementation option with respect to the power output, the controller is further configured to operate the power output to cycle power responsive to identifying that the network has failed.

7. The power device of claim 1, wherein in response to identifying that the network has failed, the controller is further configured to perform at least one of enabling the power output, disabling the power output, and cycling power to the power output.

8. The power device of claim 1 further comprising a battery coupled to the power circuitry and configured to provide battery power to the power circuitry, wherein the controller is further configured to operate the power circuitry to provide output power to the power output derived from at least one of the input power and the battery power.

9. A method for controlling power to a network device, the method comprising:
   providing output power to a power output coupled to the network device;
   periodically checking, by a controller, a status of a network connection, including attempting to communicate with a primary server;
   sending, by the controller, a domain name query to a domain name server in response to failing to communicate with the primary server;
   controlling, by the controller, the power output to continue to provide output power to the network device in response to successfully receiving a reply to the domain name query; and
   controlling, by the controller, the power output to temporarily disrupt output power provided to the network device in response to failing to receive a reply to the domain name query and failing to communicate with the primary server.

10. The method of claim 9, further comprising:
    providing, by the controller, a management interface to an operator; and
    receiving, by the controller via the management interface, an indication of the power output coupled to the network device.

11. The method of claim 9, further comprising indicating a network failure in response to failing to receive a reply from the domain name server, including at least one of causing an alert message to be displayed, illuminating a visual indicator, and sounding an audible indicator.

12. The method of claim 9, further comprising:
    providing output power to the power output by power circuitry configured to derive the output power from an input power;
    detecting a condition of the input power; and
    providing the output power, by the power circuitry, from an alternate power source in response to a condition of the input power being unacceptable.

13. The method of claim 9, further comprising increasing a delay between periodically checking the status of the network based upon a number of times power has been temporarily disrupted.

14. The method of claim 9, wherein sending a domain name query to a domain name server includes sending a domain name query to a plurality of domain name servers, a reply from any of the plurality of domain name servers being a reply to the domain name query.

15. A network connectivity confirmation system comprising:
    a power controller configured to provide power to a network access device coupled to a network; and
    a network monitoring device, coupled to the power controller, configured to periodically attempt to communicate with at least one primary server, send a domain name query with at least one domain name server via the network access device and the network in response to a determination that it cannot communicate with the at least one primary server, instructing the power controller to continue to provide power to the network access device in response to a determination that it can communicate with the at least one domain name server, identify that the network has failed in response to a determination that it cannot communicate with the at least one domain name server and the at least one primary server, and instructing the power controller to cycle power to the network access device in response to a determination that the network has failed.

16. The network connectivity confirmation system of claim 15, wherein identifying that the network has failed includes at least one of sending an alert message to a management interface and indicating that the network has failed by at least one of a visual and audible indicator.

17. The network connectivity confirmation system of claim 15 wherein identifying that the network has failed includes incrementing a counter, and periodically attempting a domain name query includes waiting an amount of time before attempting a subsequent domain name query, wherein the amount of time is responsive to the counter.

* * * * *